United States Patent Office 3,410,518
Patented Nov. 12, 1968

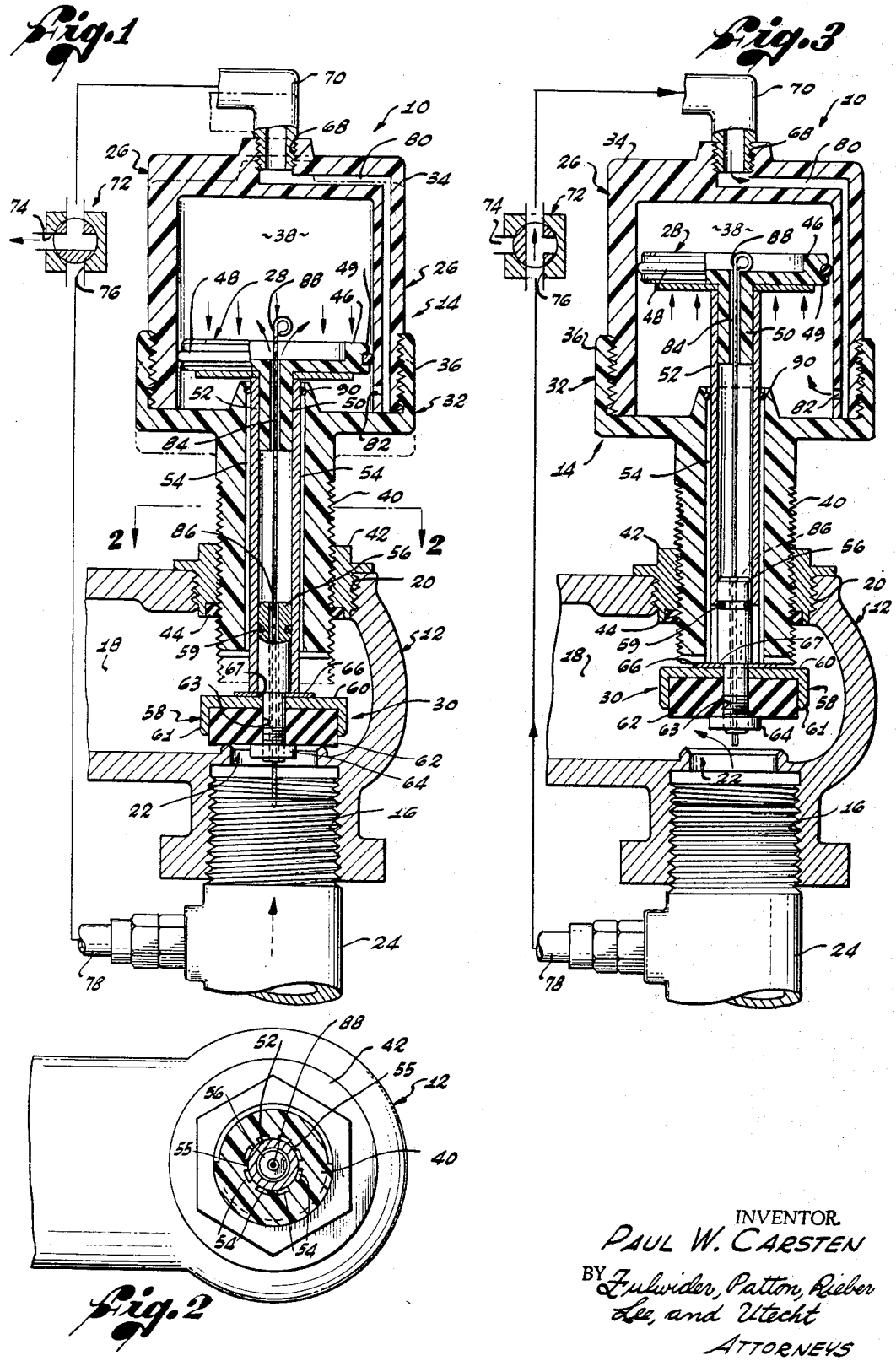

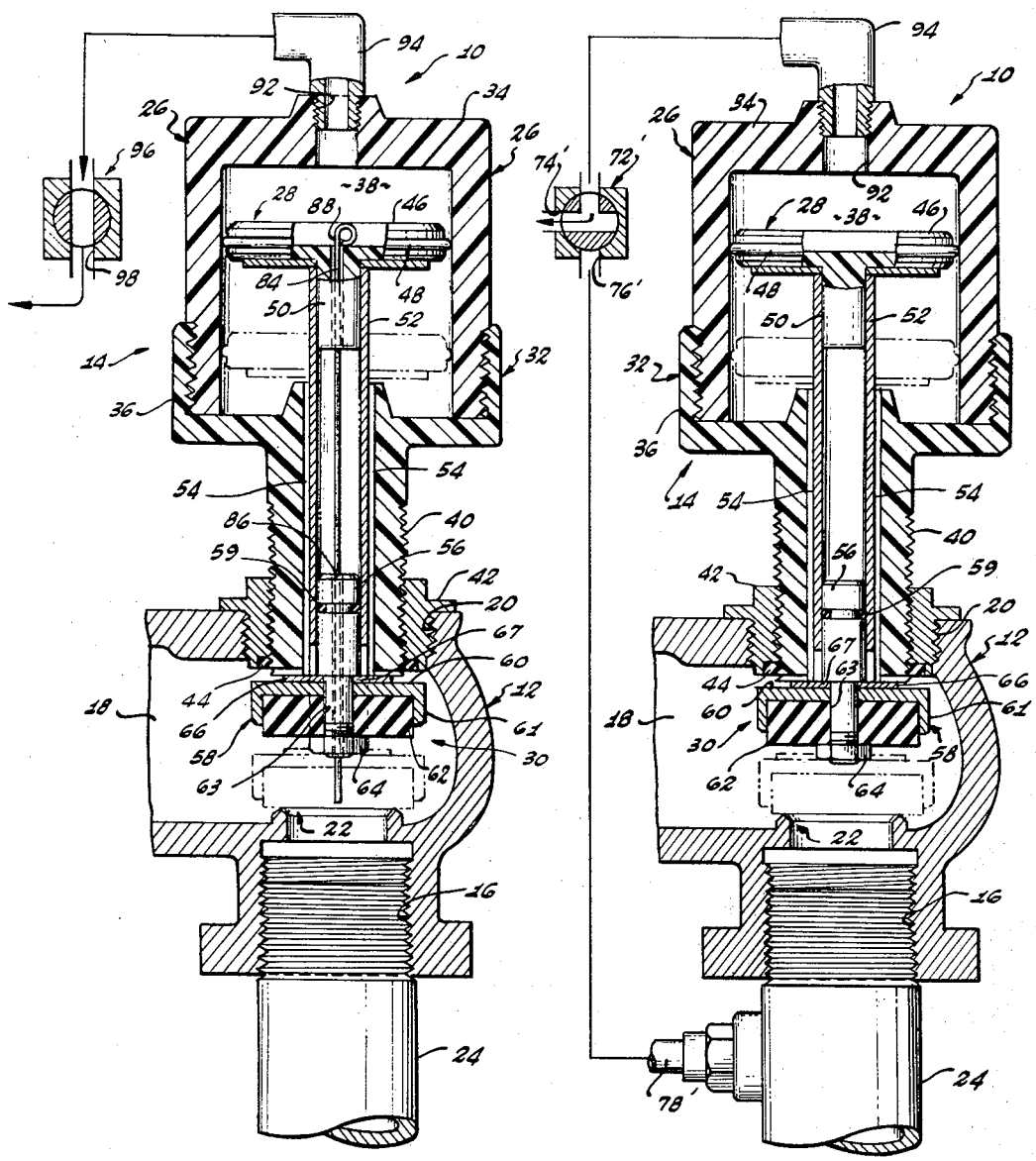

3,410,518
FLUID MOTOR OPERATED VALVE WITH MANUALLY ADJUSTABLE CYLINDER
Paul W. Carsten, Malibu, Calif., assignor to Aquamation Inc., Glendora, Calif., a corporation of California
Filed May 11, 1966, Ser. No. 549,270
11 Claims. (Cl. 251—31)

ABSTRACT OF THE DISCLOSURE

A manually adjustable valve assembly including a hollow cylinder for hand-screwing through a valve body toward and away from the valve seat to selectively limit the travel of a valve off the valve seat and to manually shut off and open the valve.

---

The present invention relates to improvements in fluid actuated valves of the type employed in automatic lawn sprinkling systems and the like and, more particularly, to a novel hydraulically actuated valve assembly which is also manually controllable to preset the flow rate through the valve as well as to close and open the valve as desired.

Hydraulically actuated valves presently used in lawn sprinkler and similar systems generally include a hollow metal cylinder connected to the top of a valve body in a water line. A movable member, such as a piston or diaphragm, is mounted in the cylinder and is adapted to move toward and away from the valve body in response to pressure differences across the movable member. A valve disc is fixedly connected to one side of the movable member and is adapted to seat on a valve seat around a fluid inlet to the valve body and to thereby close the valve upon movement of the movable member toward the inlet.

External to the cylinder and valve body, the hydraulically controlled valve includes a plurality of conduits. The conduits extend radially from the sides of the cylinder to a pilot valve and to the associated water line, to supply water to the cylinder. Operation of the pilot valve controls the flow of water to opposite sides of the movable member causing the movable member to move within the cylinder and the valve disc to move on and off of the valve seat thereby closing and opening the valve.

In order to regulate or preset the rate of water flow through the open valve, a screw member extends through the top of the cylinder to a point adjacent the top of the movable member. During operation of the valve and as the movable member travels away from the fluid inlet, it contacts the end of the screw member to define an open condition for the valve with the valve disc off the valve seat. In the open condition, the rate of water flow through the valve is determined in part by the distance between the valve disc and the valve seat. Therefore, the flow rate may be preset or regulated by turning the screw member to adjust the position of the end of the screw relative to the valve seat—the closer the end of the screw to the valve seat, the closer the valve disc to the valve seat and hence the lower the flow rate. In fact, the valve may be manually shut off by turning the screw into contact with the movable member when the valve disc is seated on the valve seat.

Although presently available hydraulically actuated valves operate in a satisfactory manner, they have many shortcomings. First of all, since the valve is formed almost entirely of metal, it is relatively expensive to manufacture and is subject to corrosion and electrolysis thereby requiring periodic inspection and maintenance.

Secondly, the valve structure including the radially extending conduits requires a relatively large amount of lateral space for connection in a water line making it very difficult to install the valve in close proximity to other valves or structures extending above the water line.

Another problem commonly found in commercially available hydraulically actuated valves is that undesired or unexpected pressure reversals downstream from the valve may be reflected through the valve upstream to damage equipment associated with the water line.

Attempts have been made to overcome some of the foregoing problems. For example, attempts have been made to employ lightweight plastic materials in the valve cylinder with hopes of reducing the overall cost of the valve as well as the problems of corrosion. Unfortunately, such attempts have failed since the plastic materials have not been able to safely withstand the tension forces developed thereon during operation of the valve particularly during manual throttling and shut off of the valve.

Accordingly, it is an object of the present invention to provide an improved hydraulically actuated valve which is simple in design, inexpensive to manufacture, and which requires little servicing over long periods of use.

Another object of the present invention is to provide a hydraulically actuated valve having the foregoing advantages which is also highly compact in design, and which is long lasting and reliable in its operation.

A further object of the present invention is to provide a novel design for hydraulically actuated valves which enables plastic materials to be safely used in the cylinder of the valve thereby materially reducing the overall cost of an maintenance requirements for the valve.

Still another object of the present invention is to provide an improved valve construction of the foregoing character which is also manually controllable to preset the flow rate through the valve as well as to close and open the valve as desired.

A still further object of the present invention is to provide an improved hydraulically actuated valve which prevents pressure reversals downstream from the valve from being reflected upstream.

The foregoing as well as other objects and advantages of the present invention may be more clearly understood by reference to the following detailed description when considered with the drawings which, by way of example only, illustrate particular forms of valve assemblies embodying the features of the present invention.

In the drawings:
FIGURE 1 is a sectional side view of a normally closed valve assembly constructed in accordance with the present invention, the valve being in a closed condition;
FIGURE 2 is a sectional view taken along the line 2—2 in FIGURE 1;
FIGURE 3 is a sectional side view of the normally closed valve of FIGURE 1 illustrating the valve in an open condition;
FIGURE 4 is a sectional side view of a continuous bleed valve constructed in accordance with the present invention; and
FIGURE 5 is a sectional side view of a normally open valve constructed in accordance with the present invention.

The illustrated valve assemblies are somewhat similar in construction. Therefore, like reference numerals are applied to like parts of each assembly.

In the drawings, the valve assembly is represented generally by the numeral 10 and comprises a valve body 12 and a valve actuator 14. The valve body 12 is adapted for connection in a water line while the actuator 14 is hydraulically controlled to open and close the valve. The actuator 14 is also manually adjustable relative to the body 12 to preset the rate of water flow through the valve as well as to manually close and open the valve as desired.

The valve body 12 is of conventional design and is formed of a metal casting having an internally threaded, bottom inlet port 16, a side outlet port 18, and an internally threaded top port 20 opposite the inlet port. An annular collar 22 extends inwardly from the inlet port 16 to define a valve seat within the valve body 12.

In the valve assembly 10, a pipe 24 is connected to the inlet port 16 to supply water to the valve assembly while the top port 20 is adapted to receive the valve actuator 14.

Generally speaking, the actuator 14 includes a cylinder 26, a piston 28, and valve means 30. The piston 28 is movable within the cylinder 26. By selectively porting water to the cylinder 26, movement of the piston 28 therein is controlled to move the valve means 30 against and away from the valve seat 22 to thereby close and open the valve assembly 10.

More particularly, the cylinder 26 includes a base 32 and a cylindrical cap 34. A top portion 36 of the base 32 is generally cylindrical and internally threaded to tightly receive an externally threaded lower end portion of the cap member 34. Thus connected, the top portion 36 of the base 32 and the cap 34 combine to define a cylindrical chamber 38 in the cylinder 26.

In addition to the top portion 36, the base 34 includes an externally threaded tubular stem portion 40 for screwing through the top port 20 in the valve body 12 toward and away from the valve seat 22. (See phantom outline in FIGURE 1.) As will be described in detail hereinafter, the adjustability of the stem portion 40 through the top port 20 provides means for (1) limiting the travel of the valve means 30 within the valve body 12 to thereby regulate or preset the rate of water flow through the open valve, (2) manually closing the valve by forcing the valve means 30 against the valve seat 22, and (3) manually opening the valve assembly 10.

In the illustrated forms of the valve assembly 10, the stem portion 40 screws into and through an adapter ring 42. The adapter ring 42 in turn screws into the top port 20 to provide longitudinal support for the stem portion 40. A seal 44 is seated around the stem portion 40 within the adapter ring 42 to prevent fluid from leaking around the stem portion outside of the valve body 12. The use of different size adapter rings allows the valve actuator 14 to be readily installed in any size valve body 12 including those already in an existing water line when it is desired to convert a manually controlled water system to a hydraulically actuated system. In a like manner, the valve means 30 also may be selected for any size of valve seat 22 to insure a complete closure of the valve in any size valve body.

In the valve actuator 14, the piston 28 is supported within the chamber 38 and comprises a disc 46. An O-ring 48 is seated in an annular recess 49 in the periphery of the disc 46 to provide a sliding seal between the piston 28 and the cylindrical inner walls of the chamber 38. In this manner, the piston 28 divides the chamber 38 into upper and lower compartments, the volumes of which are controlled by the position of the piston 28 within the cylinder.

A rod 50 extends downwardly from the center of the piston 28 and is press-fit into the upper end of a tubular member 52. The tubular member 52 extends downwardly through the stem portion 40 and is adapted to slide up and down within the stem with vertical movement of the piston 28 in the chamber 38. In this regard, the friction between the tubular member 52 and the inner walls of the stem portion 40 is reduced to a minimum by utilizing the point contact support illustrated most clearly in FIGURE 2. As represented, the inner wall of the stem portion 40 includes a plurality of angularly spaced, longitudinally extending grooves 54 defining a plurality of short, arcuate shoulders 55 for supporting the tubular member 52.

The lower end of the tubular member 52 provides support for the valve means 30 which, in the illustrated form of the valve assembly 10, includes a rod 56 adapted for sliding movement in the lower end of the tubular member, and a valve disc unit 58. An O-ring 59 extends around the rod 56 within the tubular member 52 to prevent water from leaking around the rod and into or from the tubular member. The valve disc unit 58 comprises a generally flat plate 60 having an annular, downwardly extending, flanged outer edge 61 defining a cup for tightly receiving a disc 62 of resilient material. The valve disc 58 also includes a central opening 63 for receiving the lower end of the rod 56. Thus positioned, the valve disc is secured to the rod by a nut 64 which screws onto the lower end of the rod and presses the valve disc upwardly against a retaining washer 66 and an annular shoulder 67 on the rod.

Since the rod 56 is slidable within the tubular member 52, the valve means 30 is movable to a limited extent independent of the tubular member and piston 28. As will be described hereinafter, this feature allows the valve assembly 10 to be closed with a minimum of fluid pressure and allows the valve means 30 to act as a check valve for preventing downstream pressure reversals from being reflected upstream.

As previously indicated, the valve assembly 10 includes porting for introducing water into the cylinder 26. By controlling the flow of water into the cylinder 26, the fluid forces acting on the piston 28 may be controlled to selectively regulate operation of the valve assembly 10 in opening and closing.

In FIGURES 1, 2 and 3, the valve assembly is a normally closed valve, meaning that the valve means 30 is normally seated on the valve seat 22 to block the flow of water through the valve body 12. When the valve is actuated, the valve means 30 moves upwardly with the piston 28 off of the valve seat 22 and against the stem portion 40 to allow water to flow through the valve body 12.

In the normally closed valve assembly 10, the porting for directing water to the cylinder 26 includes an internally threaded top port 68 centrally located in the top of the cap 34 for threadedly receiving a tube 70. The tube 70 is connected to a three-way pilot valve 72 having a port 74 to atmosphere and a port 76 connected by a conduit 78 to the pipe 18 upstream of the valve body 12.

The pilot valve 72 may be manually, electrically or hydraulically controlled and may be remote from the valve assembly 10 or be a part of the valve assembly.

Within the actuator 14, the porting includes a passageway 80 leading from the bottom of the top port 68 downwardly inside a side wall of the cap 34 to communicate with a side opening 82 into the cap below the piston 28. Thus, the compartment below the piston 28 is either vented to atmosphere or supplied with upstream water depending upon the condition of the pilot valve 72.

In addition to the porting to the underside of the piston 28, the porting for the normally closed valve assembly 10 includes axially aligned holes 84 and 86 extending longitudinally through the rods 50 and 56 as well as the hollow interior of the tubular member 52. A metering rod 88 having a looped upper end extends downwardly through the axially aligned holes 84 and 86 with its lower end terminating below the valve means 30. An O-ring 90 is seated around the tubular member 52 at the upper end of the stem portion 40 to prevent water from leaking around the tubular member to the outlet port 18.

When the pilot valve 42 is open to atmosphere, the pressure below the piston 28 is substantially at atmospheric pressure. Water passing upwardly around the metering rod 88 enters the upper portion of the chamber 38 and develops downward fluid forces on the top of the piston 28. As this occurs, the piston 28 moves downwardly within the chamber 38 causing the tubular member 52 to also slide downwardly in the stem portion 40 and to press against the top of the valve disc 58. As the lower end of the tubular member 52 presses on top of the valve disc, the valve disc is forced downward to seat on top of the valve seat 22 thereby blocking the fluid inlet 16 to the valve body 12 and closing the valve assembly 10.

When it is desired to open the valve assembly 10, the pilot valve 72 is adjusted to block the port 74 to atmospheric and to open the port 76 to the upstream side of the valve body 12. Water then flows from upstream through the pilot valve 72 and to the underside of the piston 28 causing upward fluid forces to be developed on the bottom surface of the piston. As this occurs, the piston 28 and tubular member 52 move upwardly within the chamber away from the valve seat 22. The upward fluid forces acting on the bottom of the valve disc 58 then cause the valve disc to move off the valve seat 22 and upwardly with the tubular member 52 until the top surface of the washer 66 engages the lower end of the stem portion 40. When the washer 66 contacts the lower end of the stem portion 40, the valve means 30 is prevented from moving further upward within the valve body. However, since the tubular member 52 is movable relative to the valve means 30, the fluid acting on the under surface of the piston 28 cause the piston to continue to move upwardly within the chamber 38 as most clearly illustrated in FIGURE 3.

When it is desired to again close the valve assembly 10, the pilot valve 72 is vented to atmosphere allowing the water to escape from under the piston and the fluid pressure above the piston to close the valve.

In the continuous bleed valve of FIGURE 4, the porting for water to the cylinder 26 is somewhat similar to that for the normally closed valve in FIGURES 1 and 3. In this respect, the metering rod 88 and holes 84 and 86 through the rods 50 and 56 are as described in connection with FIGURES 1 and 3. However, the longitudinally extending grooves 54 in the inner wall of the stem portion 40 are open to allow fluid to pass upwardly through the grooves under the bottom of the piston 28. In addition, the porting includes an internally threaded, central top port 92 in the cap 34 leading directly into the top of the chamber 38. The top port 92 is adapted to receive a tube 94 which is connected to a two-way pilot valve 96 having a port 98 to atmosphere. As with the pilot valve 72, the pilot valve 96 may be manually, electrically or hydraulically controlled to selectively vent the upper portion of the chamber 38 to atmosphere or to close the tube 94 and hence block the flow of fluid from the top of the chamber.

When the pilot valve 96 is venting the top portion of the chamber 38 to atmosphere, fluid continuously flows upwardly around the metering rod 88, into the upper portion of the chamber, and outwardly through the tube 94 and pilot valve. Fluid also passes upwardly through the longitudinal grooves 54 to the underside of the piston 28 and together with the fluid passing into the inlet port 16 exerts upward forces on the piston 28 and valve disc 58 sufficient to cause the valve assembly to open. As in the normally closed valve, the fluid forces cause the valve disc 48 to press against the bottom of the stem portion 40 and the piston 28 and tubular member 52 to move upwardly from the valve disc as illustrated by the solid outline in FIGURE 4.

When it is desired to close the valve, the pilot valve 96 is operated to block the tube 94. Fluid flowing around the metering rod 88 then builds up a pressure on top of the piston 28 forcing the piston and tubular member 52 downwardly in the cylinder 26. As this occurs, the lower end of the tubular member 52 engages the top surface of the washer 66, causing the valve disc 58 to move with the tubular member downwardly to seat on top of the valve seat 22 and to thereby close the valve assembly.

When it is desired to again open the valve assembly, the pilot valve 96 is operated to vent the top of the chamber 38 to atmosphere, thereby reducing the pressure on top of the piston 28. This allows the fluid forces on the bottom of the valve disc 58 to again force the piston and tubular member upwardly within the cylinder 26 and to again open the valve to the position illustrated in solid outline in FIGURE 4.

In the normally open valve assembly illustrated in FIGURE 5, the porting for water to the cylinder 26 is very similar to that illustrated in FIGURE 4 with the exception that the metering rod 88 and central holes 84 and 86 are not included in the valve assembly of FIGURE 5, and a three-way pilot valve 72' similar to FIGURE 1 is employed to connect the tube 70' to atmosphere or to the upstream side of the valve body 12.

When the pilot valve 72' is open to atmosphere, the pressure in the top of the chamber 38 is substantially atmospheric pressure, and the fluid forces acting on the under surface of the valve disc 58 combine with the fluid forces acting on the under surface of the piston 28 to cause the valve to open—the valve disc moving upwardly against the lower end of the stem portion 40. Thereafter, the fluid forces acting on the under surface of the piston 28 cause the piston and tubular member 52 to continue to move upwardly away from the valve disc 58 as illustrated in FIGURE 5.

When it is desired to close the valve assembly, the pilot valve 72' is simply adjusted to block the port to atmosphere and to open the port to the upstream side of the valve body 12. When this occurs, high pressure fluid passes into the top of the chamber 38 and exerts downward forces on top of the piston 28, forcing piston and tubular member 52 downwardly within the cylinder 26. The bottom of the tubular member 52 then engages the top of the washer 66 to cause the valve disc 58 to move downwardly to seat on top of the valve seat 22 and to thereby close the valve assembly.

To again open the valve assembly, the pilot valve 72' is vented to atmosphere, allowing the fluid forces acting on the underside of the valve disc 58 and piston 28 to open the valve assembly to the position illustrated in FIGURE 5.

The ability of the valve means 30 to move independent of the tubular member 52 is an important feature in the valve assembly 10 in that it (1) reduces the fluid forces required to close the valve assembly, (2) permits the valve means 30 to act as a check valve to prevent reversals in downstream pressure from being reflected upstream, and (3) allows the normally closed valve of FIGURES 1, 2 and 3 and the continuous bleed valve of FIGURE 4 to be manually opened simply by turning the cylinder 26 relative to the valve body 12.

As to the reduction of the fluid forces required to close the open valve assembly 10, since the piston 82 and tubular member 52 are spaced from the valve means 30, only the static friction of the O-ring 48 against the inner wall of the chamber 38 need be overcome to start the piston moving downward within the chamber. This is a much smaller fluid force than would be required to start the piston moving if the valve means 30 were fixedly connected to the bottom of the tubular member 52. Thereafter, the moving tubular member 52 engages the top of the washer 66 to rapidly propel the valve disc 58 downwardly against the valve seat 22 to close the valve assembly 10. In practice, it has been found that the slidable connection between the valve means 30 and tubular member 52 allows the valve assembly 10 to be converted from an open condition to a closed condition by fluid pressures insufficient to operate conventional, hydraulically actuated valves.

With regard to the check valve feature of the valve means 30, the movability of the valve disc 58 relative to the tubular member 52 allows the valve disc to act as a check valve preventing pressure reversals downstream from being reflected upstream. In particular, if the valve assembly 10 is closed and the pressure downstream suddenly increases to a value greater than that upstream, the high pressure downstream water passes up under the piston 28 through the grooves 54 in the continuous bleed and normally open valves of FIGURES 4 and 5 causing the piston to rise within the cylinder 26. However, the same fluid pressure acts on top of the valve disc 58 causing it to remain against the valve seat 22 and block the high pressure downstream fluid from passing upstream. In the normally closed valve, a pressure reversal downstream does not affect the condition of the valve, which remains closed.

If the valve assembly 10 is open and a downstream pressures reversal occurs, the downstream fluid pressure acts on top of the valve disc 58 to rapidly force the valve disc to a closed position against the valve seat 22 to prevent the high pressure from being reflected upstream.

In the normally closed and continuous bleed valves of FIGURES 1 and 4, the movability of the valve disc 58 relative to the tubular member 52 permits the valve assembly 10 to be manually opened by screwing the cylinder 26 upwardly in the valve body 12. In particular, when the valve disc 58 is seated on top of the valve seat 22, rotation of the cylinder 26 relative to the valve body 12 causes the upper end of the stem portion 40 to engage the underside of the piston 28. Continued rotation of the cylinder 26 lifts the piston 28 and tubular member 52 upwardly with the cylinder. As this occurs, the upward forces acting on the lower face of the valve disc 58 are sufficient to raise the valve disc off of the valve seat 22 and to thereby open the valve assembly 10.

In the valve assembly 10, the rate at which fluid passes through the open valve is determined in part by the distance between the valve disc 58 and the valve seat 22. This in turn is regulated by the distance which the end of the stem portion 40 extends into the valve body 12. The closer the end of the stem portion 40 to the valve seat 22, the closer the valve disc to the valve seat when the valve is open and the lower the rate of water flow through the valve. Thus, simply by turning the cylinder 26 and moving the end of the stem portion 40 toward and away from the valve seat 22, the rate of flow for the open valve may be selectively preset or manually adjusted during operation of the valve assembly.

In addition, by manually turning the cylinder 26 relative to the valve body 12, the end of the stem portion 40 may be brought into engagement with the upper portion of the valve disc 58 when seated on top of the valve seat 22. In this manner, the valve assembly 10 may be manually shut off to insure against fluid flow through the valve regardless of the condition of the pilot valve or other porting provided in the valve actuator 14. Furthermore, and as previously discussed, by manually turning the cylinder 26 relative to the valve body 12, the valve assembly 10 may be manually opened to allow water to flow therethrough to the downstream side of the valve body.

It is to be noted that the manual adjustment of the flow rate through the valve, as well as the manual closing and opening of the valve assembly 10, is accomplished with a plastic cylinder 26. The use of the plastic cylinder in the valve assembly 10 materially reduces the cost of manufacturing the valve assembly. The use of the plastic cylinder also reduces servicing and maintenance costs, since the plastic is not subject to corrosion or electrolysis.

In the design of the present invention, plastic materials may be safely employed to form the cylinder 26 without fear of damage to the cylinder during operation or adjustment of the valve assembly. In particular, when the valve assembly is open, the upper surface of the valve disc 58 bears against the lower end of the stem portion 40 to place the stem portion in compression. The same is true when the valve assembly is manually adjusted to bring the valve disc 58 into engagement with the valve seat 22 to close the valve assembly. Under such conditions, a further turning of the cylinder simply increases the compression forces on the stem portion which are easily withstood by the plastic material.

Accordingly, the present invention provides an improved hydraulically actuated, manually controllable valve assembly which is specially designed to allow the use of plastic materials in the cylinder of the valve without fear of damage to the valve structure, thereby lowering the cost of manufacture and servicing of the valve assembly.

Not only is the valve assembly simpler in design and less expensive than conventional hydraulically actuated valves, but it is also extremely reliable and rapid acting, requiring less hydraulic forces to close the valve than are required for conventional valves.

Furthermore, the valve actuator portion of the valve assembly is adapted to fit any size of valve body thereby allowing the actuator to be utilized as a separate unit for converting manually operated valves to hydraulically actuated manually controllable valves. In this regard, all that need be altered to utilize the basic valve actuator with any size valve is the proper selection of the adapter ring to fit the top port in the valve body and the proper selection of the valve disc to seat upon the valve seat within the valve body.

Although particular forms of the valve assembly have been described in some detail herein, changes and modifications may be made in the illustrated forms without departing from the spirit of the invention. It is therefore intended that the present invention be limited in scope only by the terms of the following claims.

I claim:

1. A manually adjustable valve assembly comprising:

a valve body connected in a fluid line and having means defining a valve seat between upstream and downstream sides of said body and a threaded opening opposite and on a downstream side of said valve seat;

a hollow cylinder including a closed head portion and an elongated, tubular, longitudinally extending, externally threaded cylindrical stem portion threadably mateable with, hand-screwable into and through, substantially longer than, and supported in said threaded opening in said valve body with a portion threadedly mating with said threaded opening, said head portion external to said valve body, and an end of said stem portion extending freely in said valve body inwardly beyond said threaded opening and including an end face adjacent and facing said valve seat to engage and limit movement of a valve means away from said valve seat, said end face being movable with said stem portion toward and away from said valve seat upon a turning of said stem portion in said threaded opening and said externally threaded stem portion being of sufficient length to permit a turning of said stem portion in said threaded opening to bring said end face against said valve means on said valve seat to thereby hold said valve assembly closed;

sealing means seated in said threaded opening and bearing against a longitudinally extending outer surface of said cylindrical stem portion for continuously blocking the flow of fluid from said valve assembly around said cylindrical stem portion;

movable means within said head portion of said cylinder for moving toward and away from said stem portion and for dividing said head portion into separate upper and lower compartments;

a connecting stem extending from said movable means and slidably received by and extending through said stem portion of said cylinder and into said valve body;

valve means in said valve body and extending from said connecting stem beyond said stem portion of said cylinder for seating on said valve seat to close said valve assembly upon movement of said valve means with said connecting stem and movable means toward said valve seat and for engaging said end face to limit travel of said valve means as it moves with said connecting stem and movable means away from said valve seat;

means for porting upstream fluid to said head portion of said cylinder; and means for selectively controlling said porting of fluid to said head portion to regulate opening and closing of said valve assembly.

2. The valve assembly of claim 1 wherein said end of said connecting stem is tubular and said valve means is supported for movement independent of said connecting steam and includes valve disc means for seating on said valve seat to close said valve assembly and a rod extending from said valve disc means and slidably received in said tubular end of said connecting stem.

3. The valve assembly of claim 2 further including sealing means on said rod for sliding with said rod in said tubular end of said connecting stem and for blocking fluid flow from said connecting stem around said rod.

4. The valve assembly of claim 1 wherein:

said valve assembly is a normally open valve;

said means for porting includes a central port in an end of said head portion remote from said stem portion for receiving an external tube;

and said means for selectively controlling said porting includes three-way pilot valve means for selectively connecting said tube to said line upstream from said valve body and to atmosphere.

5. The valve assembly of claim 1 including a plurality of angularly spaced, longitudinally extending grooves in the inner wall of said stem portion of said cylinder around said connecting stem, said grooves extending between said end of said stem portion and said head portion under said movable means.

6. The valve assembly of claim 5 wherein:

said valve assembly is a continuous bleed-type valve;

said means for porting includes a central port in an end of said head portion of said cylinder remote from said stem portion for receiving an external tube and a port through said valve means, connecting stem and movable means to the side of said movable means remote from said stem portion;

and said means for selectively controlling said porting includes two-way pilot valve means for blocking said tube and for opening said tube to atmosphere.

7. In a valve assembly including a valve body for connecting in a fluid line and having means defining a valve seat between upstream and downstream sides of said valve body and a threaded opening opposite and on a downstream side of said valve seat, a valve actuator comprising:

a hollow cylinder including a closed head portion and an elongated, tubular, longitudinally extending, externally threaded cylindrical stem portion threadably mateable with and substantially longer than said threaded opening in said valve body for hand-screwing into and through said threaded opening with a portion threadedly mating with said threaded opening, said head portion external to said valve body, and an end of said stem portion extending freely in said valve body inwardly beyond said threaded opening and including an end face facing said valve seat in said valve body to engage and limit movement of a valve means away from said valve seat, said end face being movable with said stem portion toward and away from said valve seat upon a turning of said stem portion in said threaded opening and said externally threaded stem portion being of sufficient length to permit a turning of said stem portion in said threaded opening to bring said end face against said valve means on said valve seat to thereby hold said valve assembly closed;

an externally and internally threaded adaptor ring for screwing into said threaded opening in said valve body and for threadedly receiving said stem portion of said cylinder to adapt said valve actuator to any size valve body;

sealing means carried in said adaptor ring and bearing against said threads of said stem portion for continuously blocking the flow of fluid from said valve actuator between said adaptor ring and said stem portion;

movable means within said head portion of said cylinder for moving toward and away from said stem portion and for dividing said head portion into separate upper and lower compartments;

a connecting stem extending from said movable means and slidably received by and extending through said stem portion of said cylinder and into said valve body;

valve means in said body and extending from said connecting stem beyond said stem portion of said cylinder for seating on said valve seat to close said valve assembly upon movement of said valve means with said connecting stem and movable means toward said valve seat and for engaging said end face to limit travel of said valve means as it moves with said connecting stem and movable means away from said valve seat; and means for porting upstream fluid to said head portion of said cylinder such that selective control of said porting may control operation of said valve assembly.

8. The valve actuator of claim 7 wherein said hollow cylinder is formed of a plastic material.

9. The valve actuator of claim 7 wherein said end of said connecting stem is tubular and said valve means is supported for movement independent of said connecting stem and includes valve disc means for seating on said valve seat to close said valve assembly and a rod extended from said valve disc means and slidably received in said tubular end of said connecting stem.

10. The valve actuator of claim 9 including a plurality of angularly spaced, longitudinally extending grooves in an inner wall of said stem portion of said cylinder around said connecting stem, said grooves extending between said end of said stem portion and said head portion under said movable means.

11. The valve actuator of claim 9 further including sealing means on said rod for sliding with said rod in said tubular end of said connecting stem and for blocking fluid flow from said connecting stem around said rod.

References Cited

UNITED STATES PATENTS

| | | | |
|---|---|---|---|
| 845,063 | 2/1907 | Desper | 251—31 X |
| 981,313 | 1/1911 | Robinson | 251—63.5 X |
| 1,172,421 | 2/1916 | Beck | 251—43 X |
| 1,646,640 | 10/1927 | Daniel | 251—43 X |
| 2,010,088 | 8/1935 | Kohler | 251—285 X |
| 2,694,545 | 11/1954 | Steenbergh | 251—63.5 |
| 2,697,581 | 12/1954 | Ray | 251—129 |
| 2,934,307 | 4/1960 | Henderson | 251—41 |
| 3,315,696 | 4/1967 | Hunter | 251—63 X |

ARNOLD ROSENTHAL, *Primary Examiner.*